is a gas-phase reaction summarized by

United States Patent Office 3,047,639
Patented July 31, 1962

3,047,639
MANUFACTURE OF CHLOROFLUOROPROPENES
William J. Cunningham, Rockaway, Richard F. Sweeney, Randolph Township, Morris County, and Cyril Woolf, Morristown, N.J., assignors to Allied Chemical Corporation, New York, N.Y., a corporation of New York
No Drawing. Filed Mar. 22, 1960, Ser. No. 16,633
8 Claims. (Cl. 260—653.3)

This invention relates to processes for making 3-chloropentafluoropropene-1, $CClF_2CF=CF_2$, B.P. 7.5° C. This material is useful in the production of co-polymers, and is also a valuable intermediate for the manufacture of $C_3F_7Cl$ and $C_3F_8$ refrigerants and dielectrics.

The prior art suggests manufacture of 3-chloropentafluoropropene-1 by pyrolysis of chlorotrifluoroethylene, $CClF=CF_2$, B.P. minus 26.8° C. This operation, carried out by subjecting chlorotrifluoroethylene alone to the action of heat in the absence of a catalyst, is characterized by formation of reacted products which comprise a notably minor proportion of monochloropentafluoropropenes and a corresponding large major proportion of a complex mixture of compounds including 1,2-dichlorohexafluorocyclobutane, 3,4-dichlorohexafluorobutene-1, and a mixture of dichlorotetrafluoropropene isomers. For whatever 3-chloropentafluoropropene-1 may be formed, there is produced an unavoidably equivalent amount of the disproportionation product dichlorotetrafluoropropene. In the prior art proposed process, involving pyrolysis of chlorotetrafluoroethylene alone, yields of 3-chloropentafluoropropene-1 are low e.g. 20% and considerably less. Accordingly, disadvantages of the prior art proposal are such as to substantially penalize use of this method in industrial practice.

Unless otherwise indicated, "yields" herein are based on the amount of starting material consumed, i.e. mols of sought-for product divided by mols of starting material consumed multiplied by 100.

A major object of this invention lies in the provision of a procedurally simple process for making 3-chloropentafluoropropene-1 in high yields.

In accordance with this invention, it has been found that 3-chloropentafluoropropene-1 can be made advantageously from chlorotrifluoroethylene and chlorodifluoromethane, $CHClF_2$, B.P. minus 40.8° C. We find that good yields of 3-chloropentafluoropropene-1 may be obtained by reacting chlorotrifluoroethylene and chlorodifluoromethane under certain reaction conditions principally of temperature and mol ratios of chlorotrifluoroethylene and chlorotrifluoromethane charged to the reaction zone. The process of the invention is a gas-phase reaction summarized by

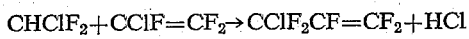

$$CHClF_2 + CClF=CF_2 \rightarrow CClF_2CF=CF_2 + HCl$$

Briefly, general procedural steps of practice of the invention process comprise charging chlorodifluoromethane and chlorotrifluoroethylene starting materials in certain molecular proportions into a reaction zone maintained at certain relatively high temperatures, and recovering 3-chloropentafluoropropene-1 from the reaction zone exit.

The process is carried out, preferably, in the absence of a catalyst, in an unobstructed reaction zone formed of refractory material such as a tubular quartz reactor heated externally by a suitable electric furnace provided with accessories to facilitate maintenance of given internal temperatures in the reaction zone. The reactor may be made of or lined with other inert refractory material such as Alundum firebrick or zirconia. The reactor system also includes suitable means for charging metered quantities of chlorodifluoromethane and chlorotrifluoroethylene into the reaction zone.

In accordance with the invention, it has been found that good yields of sought-for 3-chloropentafluoropropene-1 depend to a major extent upon the molecular ratios of the chlorodifluoromethane and chlorotrifluoroethylene fed to the reaction zone. Gaseous input to the latter should contain $CHClF_2$ and not less than about one molecular proportion of $CClF=CF_2$. A greater proportion of $CHClF_2$ induces formation of rapidly increasing amounts of undesirable tetrafluoroethylene. While in some instances, more than three molecular proportions of $CClF=CF_2$ may be employed, we find that in order to obtain best yields of 3-chloropentafluoropropene-1 and minimize losses to formation of dichlorotetrafluoropropene and dimers of $CClF=CF_2$, the proportion of $CClF=CF_2$ should not exceed about three mols. Accordingly, it is preferred to charge into the reaction zone a gaseous mixture of $CHClF_2$ and $CClF=CF_2$ in mol proportions substantially in the range of 1:1 to 1:3.

Temperatures needed to effect the desired results are relatively high. It has been found that reaction initiates at about 625° C., and that at temperature above about 750° C. notable decomposition is effected even with very short residence time. Preferred operating temperatures lie substantially in the range of 650–725° C. Pressure is preferably substantially atmospheric, although sub- or superatmospheric pressure may be employed.

Experience shows that, for industrially significant results, residence time is of major importance and should not exceed about 5 seconds. Higher residence time is conducive to appreciable decomposition, and it is preferred to operate substantially in the range of 0.5–3 seconds.

When proceeding in accordance with the foregoing, the major reacted product exiting the reactor is a monochloropentafluoropropene fraction containing the sought-for 3-chloropentafluoropropene-1. In general, reacted products contain of the order of 50–55% by weight of monochloropentafluoropropene, less than about 5% of dichlorotetrafluoropropene isomers, B.P. 45–48° C., not more than about 25% of dimers of chlorotrifluoroethylene, B.P. 60–70° C., and not more than about 10% of product having an empirical composition of $C_4F_7Cl$. Monochloropentafluoropropenes have boiling points in the range of about 6–10° C. The invention process is such that the monochloropentafluoropropene recovered, a useable commercial product, is dominantly 3-chloropentafluoropropene-1, and usually and preferably contains more than 90% by weight of the sought-for 3-chloropentafluoropropene-1. Generally, the latter is associated with less than 5% of 2-chloropentafluoropropene-1, and no significant amount of 1-chlorotetrafluoropropene-1.

Exit of the reactor may be handled more or less as is conventional practice in this art to recover the sought-for product. For example, reaction zone exit may be passed thru a water scrub tower to remove HCl, and the exit of the scrubber may be totally condensed. Various constituents of the condensate may be then separated by fractional distillation.

The following examples illustrate practice of the invention. Percentages are by weight unless otherwise indicated.

Example 1.—The reactor employed comprised a ¾" I.D. unpacked quartz tube 48" in length, heated externally by an enveloping 30" tubular electric furnace. The reactor was provided at the inlet end with suitable means for metered introduction of gaseous $CHClF_2$ and $CClF=CF_2$, while the reactor outlet was connected to the inlet end of a products recovery train. During a period of about 4.5 hrs. about 708 gms. (8.2 mols) of $CHClF_2$ and about 2238 gms. (19.1 mols) of $CClF=CF_2$ were fed into the reactor. Metering was such that $CHClF_2$ and $CClF=CF_2$ were charged in molecular proportions of about one to 2.32 respectively. Throughout the run, temperature in the heated zone of the reactor was maintained at about 700°

C., and residence time in the reactor heated zone was about 1.6 seconds. Materials exiting the reactor were passed thru a water scrubber in which about 6.3 mols of HCl were absorbed. The gas leaving the scrubber was passed thru an anhydrous $CaCl_2$ drier, to remove water vapor, and the drier exit was charged into a refrigerated stripping still operated so that all materials boiling below about minus 25° C. were stripped out and passed off as vapor, while all materials boiling above about minus 25° C. were condensed and held in the still as still bottoms during the course of the run. On completion of the run, the condensed still bottoms were fractionally distilled to obtain higher boiling products.

Material boiling below about minus 25° C. amounted to about 1019 gms. Analysis, including infrared technique, showed that such material consisted of about 90% $CClF=CF_2$ and about 10% $CHClF_2$, and was equivalent to about 7.87 mols of $CClF=CF_2$ and about 1.1 mols of $CHClF_2$. Products boiling in the monochloropentafluoropropene range of about 6-10° C. amounted to about 811 gms. Analysis, including infrared technique, showed material boiling in this 6-10° C. range to be 3-chloropentafluoropropene-1 containing less than 5% 2-chloropentafluoropropene-1, and no 1-chloropentafluoropropene-1 was indicated. Products boiling above 10° C. amounted to 767 gms., and comprised mostly $C_4F_7Cl$, B.P. 30-35° C.; $C_3F_4Cl_2$, B.P. 44-49° C.; and $(C_2F_3Cl)_2$, B.P. 60-70° C. Conversion of $CHClF_2$ was about 86%, and conversion of $CClF=CF_2$ was about 61%. On the basis of the $CHClF_2$ reacted, yield of 3-chloropentafluoropropene-1 was about 81.1%, and on the basis of $CClF=CF_2$ reacted yield of 3-chloropentafluoropropene-1 was about 46%, such yields being based on 3-chloropentafluoropropene-1 alone, and not on the monochloropentafluoropropene fraction.

*Example 2.*—The reactor and recovery systems were the same as in Example 1. In the instant run, during a period of about 4 hrs., about 1298 gms. (15.0 mols) of $CHClF_2$ and about 2454 gms. (21.1 mols) of $CClF=CF_2$ were charged into the reactor in mol proportions of about one $CHClF_2$ to 1.4 $CClF=CF_2$. Temperature in the heated zone of the reactor was maintained at about 700° C. throughout the run, and residence time in the heated zone of the reactor was about 0.96 second. In the water scrubber, about 9.9 mols of HCl were removed. Products boiling below about minus 25° C. amounted to 1624 gms., and composition-wise were about the same as in Example 1. Product boiling in the range of about 6-10° C. amounted to about 713 gms. and was identified as 3-chloropentafluoropropene-1 containing less than about 5% of 2-chloropentafluoropropene-1, and no 1-chloropentafluoropropene-1. Products boiling above about 10° C. amounted to about 643 gms. and composition-wise were about the same as in Example 1. Conversion of $CHClF_2$ was about 88%, and conversion of $CClF=CF_2$ was about 57%. Yield of 3-chloropentafluoropropene-1, based on reacted $CHClF_2$ and $CClF=CF_2$ were about 42.4% and 58.5%, respectively, such yields referring to 3-chloropentafluoropropene-1 alone, and not to the monochloropentafluoropropene fraction.

*Example 3.*—This example illustrates results obtained by pyrolysis of $CClF=CF_2$ alone under otherwise relatively comparable operating conditions. Apparatus employed was the same as in above Examples 1 and 2 except the water scrubber was omitted. During a period of about 1.5 hrs. 1346 gms. (11.55 mols) of $CClF=CF_2$ were charged into the reactor. Temperature in the heated part of the latter was maintained at about 700° C. throughout the run, and residence time in the heated part of the reactor was about 1.3 seconds. Materials exiting the reactor were condensed in a Dry Ice-acetone trap, and the resulting condensate fractionally distilled. Material boiling at about minus 25-26° C. amounted to 1050 gms. and was identified as $CClF=CF_2$. Products boiling substantially in the range of 6-10° C. amounted to 30 gms. which, by analysis involving infrared technique, was shown to contain 70% of 3-chloropentafluoropropene-1 with the balance comprising higher boiling material not identified. Based on the amount of incoming $CClF=CF_2$ which reacted, yield of chloropentafluoropropene was about 10.5%.

We claim:

1. Process for making 3-chloropentafluoropropene-1 which comprises heating in a reaction zone a gaseous mixture of $CHClF_2$ and not less than about one molecular proportion of $CClF=CF_2$ to temperature substantially in the range of 625-750° C., and recovering from the reaction zone exit monochloropentafluoropropene containing a dominant weight proportion of 3-chloropentafluoropropene-1.

2. The process of claim 1 in which temperature is substantially in the range of 650-725° C.

3. The process of claim 1 in which residence time does not exceed about 5 seconds.

4. Process for making 3-chloropentafluoropropene-1 which comprises introducing into a reaction zone a gaseous mixture of $CHClF_2$ and $CClF=CF_2$ in mol proportions substantially in the range of 1:1 to 1:3, heating said mixture in said zone to temperature substantially in the range of 625-750° C., and recovering from the reaction zone exit monochloropentafluoropropene containing a dominant weight proportion of 3-chloropentafluoropropene-1.

5. The process of claim 4 in which temperature is substantially in the range of 650-725° C.

6. The process of claim 4 in which residence time does not exceed about 5 seconds.

7. Process for making 3-chloropentafluoropropene-1 which comprises introducing into a reaction zone a gaseous mixture of $CHClF_2$ and $CClF=CF_2$ in mol proportions substantially in the range of 1:1 to 1:3, heating said mixture in said zone, for residence time substantially in the range of 0.5-3.0 seconds, to temperature substantially in the range of 625-750° C., and recovering from the reaction zone exit monochloropentafluoropropene containing a dominant weight proportion of 3-chloropentafluoropropene-1.

8. The process of claim 7 in which temperature is substantially in the range of 650-725° C., and the reaction is effected in the absence of a catalyst.

References Cited in the file of this patent

UNITED STATES PATENTS

| 2,733,277 | Miller | Jan. 31, 1956 |
| 2,931,840 | Marquis | Apr. 5, 1960 |

FOREIGN PATENTS

| 505,153 | Canada | Aug. 17, 1954 |